United States Patent
Mayer et al.

(10) Patent No.: US 9,140,137 B2
(45) Date of Patent: Sep. 22, 2015

(54) GAS TURBINE ENGINE MID TURBINE FRAME BEARING SUPPORT

(75) Inventors: Robert Russell Mayer, Manchester, CT (US); George J. Kramer, Tolland, CT (US); Paul W. Palmer, South Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 750 days.

(21) Appl. No.: 13/362,747

(22) Filed: Jan. 31, 2012

(65) Prior Publication Data
US 2013/0192261 A1   Aug. 1, 2013

(51) Int. Cl.
*F01D 25/16*   (2006.01)
*F23R 3/00*   (2006.01)
*F23R 3/60*   (2006.01)

(52) U.S. Cl.
CPC ............. *F01D 25/164* (2013.01); *F23R 3/002* (2013.01); *F23R 3/60* (2013.01); *Y02T 50/671* (2013.01)

(58) Field of Classification Search
CPC .......... F23R 3/60; F23R 3/002; Y02T 50/671
USPC ......... 60/805, 796, 798, 39.83; 415/142, 180, 415/229
See application file for complete search history.

(56) References Cited

U.S. PATENT DOCUMENTS

| | | | |
|---|---|---|---|
| 2,928,648 A * | 3/1960 | Haines et al. | 415/138 |
| 4,505,443 A * | 3/1985 | Bradfield et al. | 244/12.5 |
| 5,292,227 A | 3/1994 | Czachor et al. | |
| 5,483,792 A | 1/1996 | Czachor et al. | |
| 6,439,841 B1 | 8/2002 | Bosel | |
| 6,547,518 B1 | 4/2003 | Czachor et al. | |
| 6,860,716 B2 | 3/2005 | Czachor et al. | |
| 7,694,505 B2 | 4/2010 | Schilling | |
| 7,775,049 B2 | 8/2010 | Kumar et al. | |
| 7,934,900 B1 | 5/2011 | Pask | |
| 8,061,969 B2 | 11/2011 | Durocher et al. | |
| 8,091,371 B2 | 1/2012 | Durocher et al. | |
| 2003/0163983 A1 * | 9/2003 | Seda et al. | 60/226.1 |
| 2005/0152626 A1 | 7/2005 | Gerez et al. | |
| 2008/0031727 A1 | 2/2008 | Sjoqvist | |
| 2010/0132371 A1 * | 6/2010 | Durocher et al. | 60/796 |
| 2010/0221102 A1 * | 9/2010 | Dawson et al. | 415/144 |
| 2011/0008163 A1 * | 1/2011 | Prentice et al. | 415/209.3 |

FOREIGN PATENT DOCUMENTS

WO   2008/088328 A1   7/2008

OTHER PUBLICATIONS

International Search Report and Written Opinion for International Application No. PCT/US2013/022837 completed on Sep. 13, 2013.
Gunston, Bill, "Jane's Aero-Engines," Issue Seven, 2000, pp. 510-512.
International Preliminary Report on Patentability for International Application No. PCT/US2013/022837 . Date of issuance Aug. 5, 2014.
Singapore Search Report and Written Opinion for Singapore Application No. 11201402940P mailed Apr. 6, 2015.

* cited by examiner

*Primary Examiner* — Gerald L Sung
(74) *Attorney, Agent, or Firm* — Carlson, Gaskey & Olds, P.C.

(57) ABSTRACT

A gas turbine engine includes high and low pressure turbines. A mid turbine frame is arranged axially between the high and low pressure turbines. A bearing is operatively supported by a support structure. An inner case is secured to the support structure and includes a first conical member and a bearing support to which the bearing is mounted. The bearing support includes a second conical member that is secured to the first conical member at a joint. The first and second conical members are arranged radially inward of the joint.

15 Claims, 3 Drawing Sheets

GAS TURBINE ENGINE MID TURBINE FRAME BEARING SUPPORT

BACKGROUND

This disclosure relates to a gas turbine engine mid turbine frame bearing support.

One typical gas turbine engine includes multiple, nested coaxial spools. A low pressure turbine is mounted on a first spool, and a high pressure turbine is mounted on a second spool. A mid turbine frame, which is part of the engine's static structure, is arranged axially between the low and high pressure turbines. The turbine frame includes an inner hub and outer shroud with a circumferential array of airfoils adjoining the hub and shroud, providing a gas flow path.

One typical static structure design provide a single, conical member between "hot" components, like the gas flow path and supporting case structures, and "cold" components, such as bearing compartments that must be kept at low temperatures to prevent oil coking. The conical member allows the cold and hot parts to axially shift relative to one another to accommodate the different thermal expansion rates of the cold and hot parts. This conical member is generally long in both the axial direction, and in radial height when compared to the bearing compartment.

SUMMARY

A gas turbine engine includes high and low pressure turbines. A mid turbine frame is arranged axially between the high and low pressure turbines. A bearing is operatively supported by a support structure. An inner case is secured to the support structure and includes a first conical member and a bearing support to which the bearing is mounted. The bearing support includes a second conical member that is secured to the first conical member at a joint. The first and second conical members are arranged radially inward of the joint.

In a further embodiment of any of the above, mid turbine frame includes a circumferential array of airfoils that provide a cavity there through, and the support structure includes a rod extending through the airfoil and fastened to the inner case.

In a further embodiment of any of the above, the rod is secured to the inner case by a nut, and the nut is arranged radially inward from the joint.

In a further embodiment of any of the above, the first and second conical members are discrete from and adjoin one another and are secured to one another by fasteners.

In a further embodiment of any of the above, the first and second conical members are arranged on a same axial side of the joint.

In a further embodiment of any of the above, the first and second conical members are arranged on opposing axial sides of the joint.

In a further embodiment of any of the above, the bearing is arranged in a bearing compartment, and a cooling compartment is provided between sealing assemblies supported by the inner case.

In a further embodiment of any of the above, the first conical member is integral with the inner case.

In a further embodiment of any of the above, the second conical member is integral with the bearing support.

In a further embodiment of any of the above, the bearing support is provided by an intermediate member, and the second conical member is secured to the intermediate member at an intermediate joint.

In a further embodiment of any of the above, the gas turbine engine includes a fan and a compressor section fluidly connected to the fan. The compressor includes a high pressure compressor and a low pressure compressor. A combustor is fluidly connected to the compressor section, and a turbine section is fluidly connected to the combustor. The turbine section includes the high pressure turbine coupled to the high pressure compressor via a first shaft, and the low pressure turbine coupled to the low pressure compressor via a second shaft. A geared architecture is interconnects the second shaft and the fan.

In a further embodiment of any of the above, the gas turbine engine is a high bypass geared aircraft engine having a bypass ratio of greater than about six (6).

In a further embodiment of any of the above, the gas turbine engine includes a low Fan Pressure Ratio of less than about 1.45.

In a further embodiment of any of the above, the low pressure turbine has a pressure ratio that is greater than about 5.

In a further embodiment of any of the above, the geared architecture includes a gear reduction ratio of greater than about 2.5:1.

In a further embodiment of any of the above, the fan includes a low corrected fan tip speed of less than about 1150 ft/s.

A gas turbine engine includes a first cone connecting a bearing compartment to a mid-turbine frame. A second cone connects the bearing compartment to the mid-turbine frame. The first cone at least partially surrounds the second cone.

In a further embodiment of any of the above, the first cone is integral to the mid-turbine frame.

In a further embodiment of any of the above, the first cone is fastened to the mid-turbine frame.

A gas turbine engine includes a first cone connecting a bearing compartment to a mid-turbine frame. A second cone connects the bearing compartment to the mid-turbine frame. The first cone is fastened and nested radially to the second cone.

BRIEF DESCRIPTION OF THE DRAWINGS

The disclosure can be further understood by reference to the following detailed description when considered in connection with the accompanying drawings wherein.

DETAILED DESCRIPTION

Figure 1:
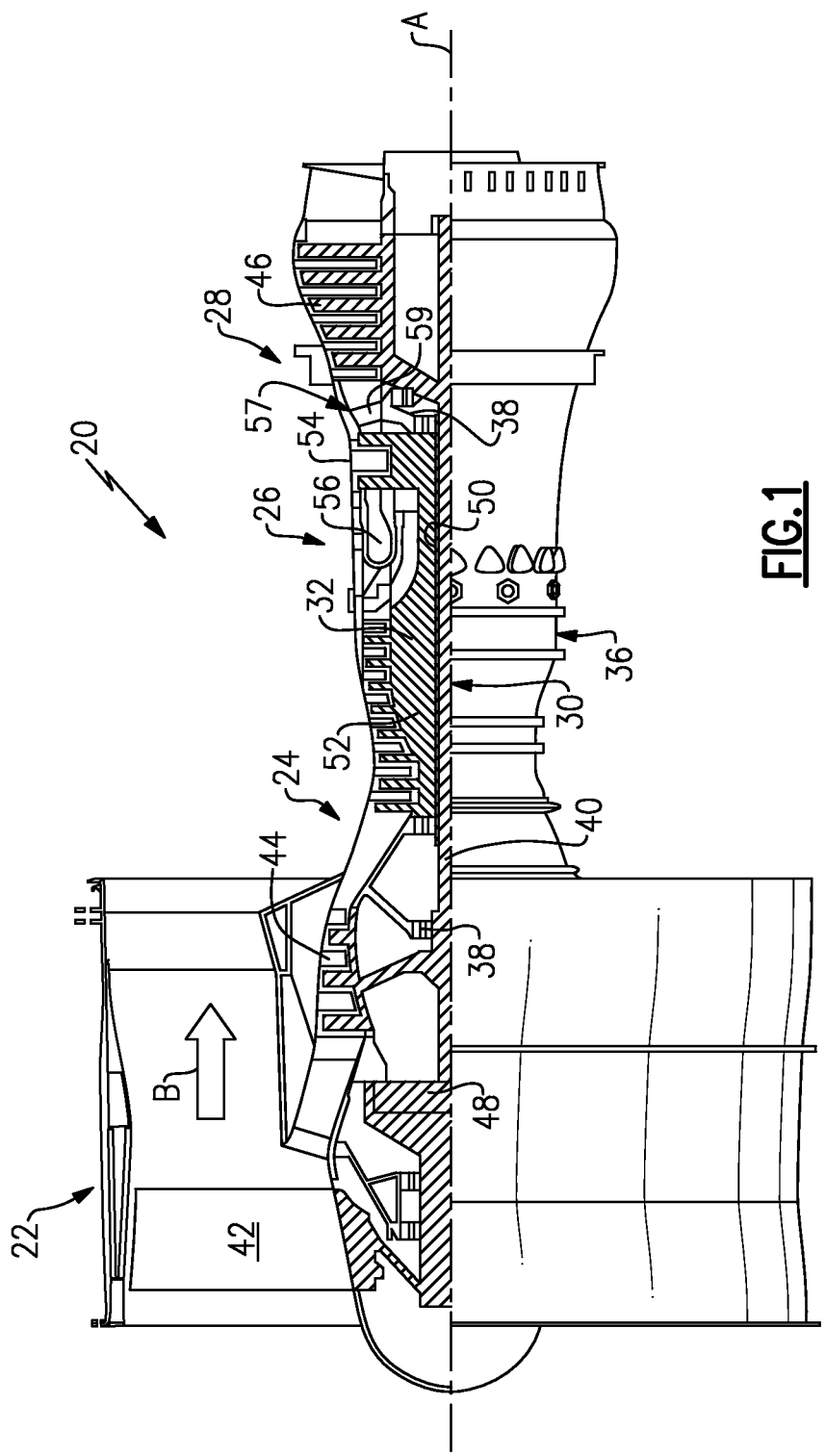
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than a ratio of approximately 10:1, the geared architecture 48 is an epicyclic gear train, such as a planetary gear system or other gear system, with a gear reduction ratio of greater than about 2.3:1 and the low pressure turbine 46 has a pressure ratio that is greater than about 5. In one disclosed embodiment, the engine 20 bypass ratio is greater than about 10:1, the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point.

To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
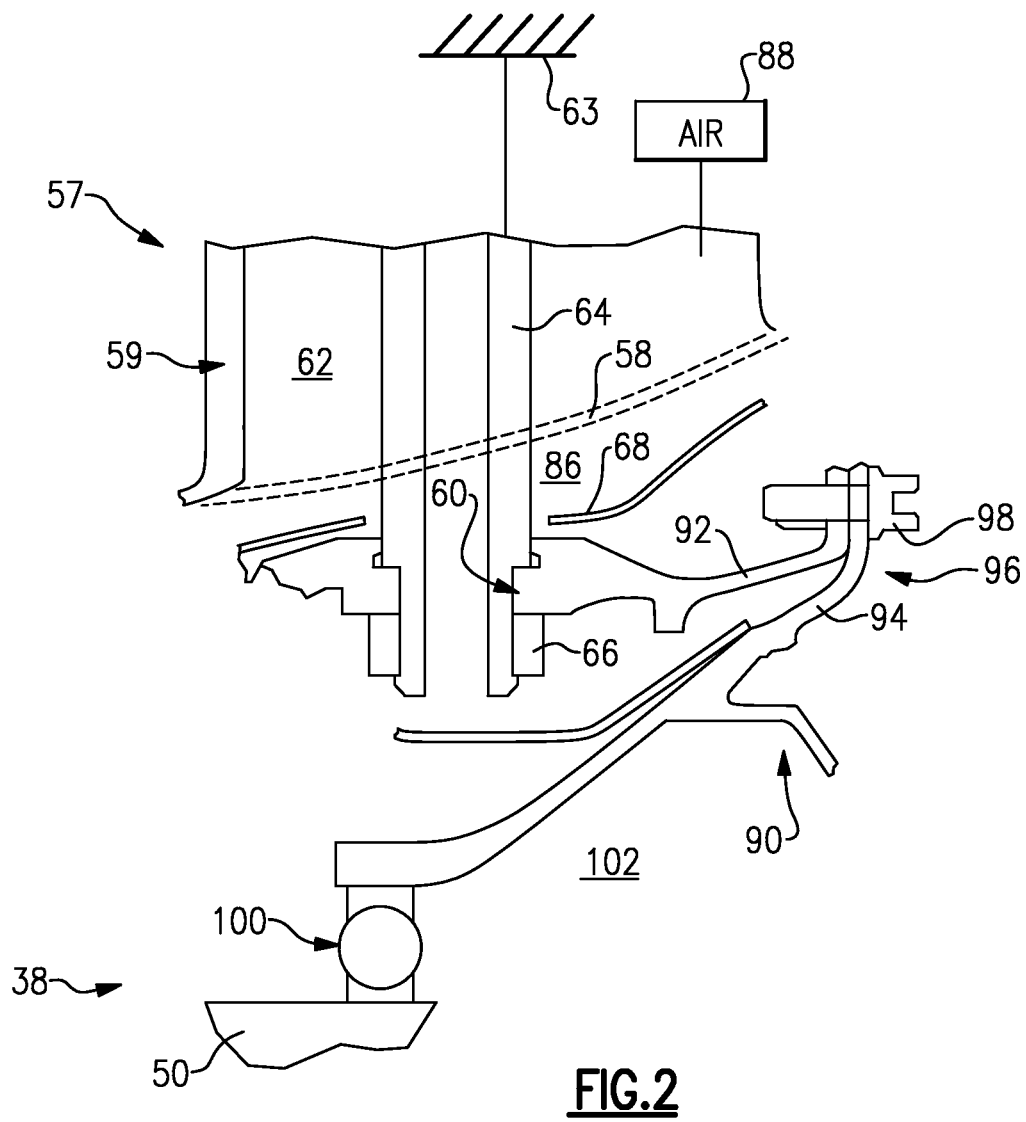
FIG. 2 is a cross-sectional view of a portion of an engine static structure in the area of a mid turbine frame.

Referring to FIG. 2, the mid turbine frame 57 includes a hub 58 supporting the airfoil 59. In one example, the mid turbine frame 57 is a nickel alloy, but is not intended to carry the structural load of the bearing system 38 and its supported components. Instead, an inner case 60 provided the support structure of the mid turbine frame 57 and is supported by radially extending, circumferentially arranged rods 64 secured to the inner case 60 by a nut 66. The rods 64 are mounted to support structure 63.

The mid turbine frame 57 is a "hot" component that is isolated from the bearing system 38, a "cold" component. To this end, an air seal 68 is provided to create a cooling cavity 86 between the inner case 60 and the mid turbine frame 57. A cooling source 88, such as low compressor turbine air, is in fluid communication with the cooling cavity 86, for example, through passages 62 provided in the airfoils 59.

A bearing support 90 is secured to the inner case 60 at a joint 96 with fasteners 98. A bearing 100 supports the outer shaft 50, for example, for rotation relative to the bearing support 90. The joint 96 is provided structurally between the bearing 100 and the support structure 63 (and rod 64 in the example). The bearing 100 is arranged in a bearing compartment 102 sealed by a bearing compartment seal.

Instead of a single conical member, at least two conical members 92, 94, which may be nickel alloys, are used to provide structural support from the rods 64, in the example, to the bearing 100. The first and second conical members 92, 94 connect the bearing 100 to the mid turbine frame 57. Such an arrangement provides a more radially compact support configuration while maintaining flexibility between the "hot" and "cold" components throughout various thermal gradients. The first and second conical members 92, 94, or cones, are nested relative to one another and arranged radially inward of the joint 96. In the example shown in FIG. 2, the first and second conical members 92, 94 are arranged on the same axial side of the joint 96. The first conical member 92 at least partially surrounds the second conical member 94.

Figure 3:
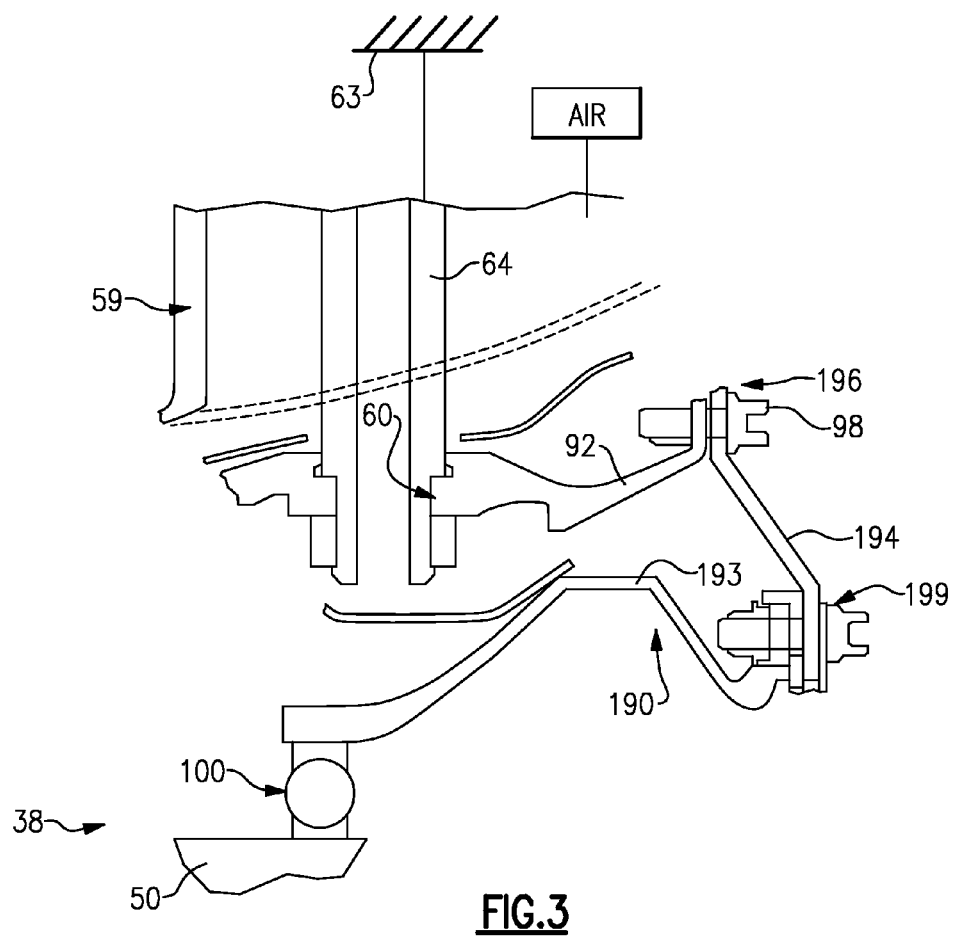
FIG. 3 is another example cross-sectional view of a portion of an engine static structure in the area of a mid turbine frame.

In an example shown in FIG. 3, the first and second conical members 92, 194 are arranged on opposing axial sides of the joint 196. The bearing support 190 is provided by an intermediate member 193 that supports the bearing 100 and is secured to the second conical member 194 at an intermediate joint 199.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
high and low pressure turbines;
a mid turbine frame arranged axially between the high and low pressure turbines;

a bearing operatively supported by a support structure;
an inner case secured to the support structure and including a first conical member; and
a bearing support to which the bearing is mounted, the bearing support including a second conical member that is secured to the first conical member at a joint, the first and second conical members arranged radially inward of the joint, the joint provided at a plane perpendicular to a rotational axis of the high and low pressure turbines, a first axial side on one side of the plane, and a second axial side on another side of the plane opposite the one side, the first and second conical members are arranged on the first axial side.

2. The gas turbine engine according to claim 1, wherein the first and second conical members are discrete from and adjoin one another and are secured to one another by fasteners.

3. The gas turbine engine according to claim 1, wherein the bearing is arranged in a bearing compartment, and a cooling compartment is provided between sealing assemblies supported by the inner case.

4. The gas turbine engine according to claim 1, wherein the first conical member is integral with the inner case.

5. The gas turbine engine according to claim 1, wherein the second conical member is integral with the bearing support.

6. The gas turbine engine according to claim 1, comprising:
a fan;
a compressor section fluidly connected to the fan, the compressor comprising a high pressure compressor and a low pressure compressor;
a combustor fluidly connected to the compressor section;
a turbine section fluidly connected to the combustor, the turbine section comprising:
the high pressure turbine coupled to the high pressure compressor via a first shaft;
the low pressure turbine coupled to the low pressure compressor via a second shaft; and
a geared architecture interconnects between the second shaft and the fan.

7. The gas turbine engine according to claim 6, wherein the gas turbine engine includes a low Fan Pressure Ratio of less than 1.45.

8. The gas turbine engine according to claim 6, wherein the fan includes a low corrected fan tip speed of less than 1150 ft/s.

9. The gas turbine engine according to claim 1, wherein the first conical member is at least partially surrounding the second conical member.

10. The gas turbine engine of claim 9, wherein the first conical member is integral to the mid-turbine frame.

11. The gas turbine engine of claim 9, wherein the first conical member is fastened to the mid-turbine frame.

12. The gas turbine engine according to claim 1, wherein the first conical member is fastened and nested radially to the second conical member.

13. A gas turbine engine comprising:
high and low pressure turbines;
a mid turbine frame arranged axially between the high and low pressure turbines, wherein mid turbine frame includes a circumferential array of airfoils that provide a cavity there through;
a bearing operatively supported by a support structure;
an inner case secured to the support structure and including a first conical member, and the support structure includes a rod extending through the airfoil and fastened to the inner case, wherein the rod is secured to the inner case by a nut; and
a bearing support to which the bearing is mounted, the bearing support including a second conical member that is secured to the first conical member at a joint, the first and second conical members arranged radially inward of the joint, and the nut is arranged radially inward from the joint.

14. The gas turbine engine according to claim 13, the joint provided at a plane perpendicular to a rotational axis of the high and low pressure turbines, a first axial side on one side of the plane, and a second axial side on another side of the plane opposite the one side, wherein the first and second conical members are arranged on the one side and the other side, respectively.

15. The gas turbine engine according to claim 13, wherein the bearing support is provided by an intermediate member, and the second conical member is secured to the intermediate member at an intermediate joint.

* * * * *